United States Patent
Ferguson

(10) Patent No.: US 7,978,933 B2
(45) Date of Patent: Jul. 12, 2011

(54) SYSTEMS AND METHODS FOR ROBUST VIDEO TEMPORAL REGISTRATION

(75) Inventor: Kevin M. Ferguson, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 727 days.

(21) Appl. No.: 12/104,380

(22) Filed: Apr. 16, 2008

(65) Prior Publication Data

US 2008/0253689 A1 Oct. 16, 2008

Related U.S. Application Data

(60) Provisional application No. 60/912,167, filed on Apr. 16, 2007.

(51) Int. Cl.
*G06K 9/32* (2006.01)
(52) U.S. Cl. ..................................................... 382/294
(58) Field of Classification Search .............. 382/294, 382/209, 217–218, 276, 278, 281; 348/180; 600/443
See application file for complete search history.

(56) References Cited

U.S. PATENT DOCUMENTS

| | | | | |
|---|---|---|---|---|
| 6,589,176 B2 * | 7/2003 | Jago et al. | | 600/443 |
| 6,751,360 B1 * | 6/2004 | Lu | | 382/278 |
| 7,705,881 B2 * | 4/2010 | Okamoto et al. | | 348/180 |
| 7,747,103 B2 * | 6/2010 | Iizuka | | 382/278 |
| 2006/0215232 A1 | 9/2006 | Ziv-el | | |
| 2008/0152257 A1 * | 6/2008 | Ferguson | | 382/281 |
| 2010/0225767 A1 * | 9/2010 | Ferguson | | 348/180 |

FOREIGN PATENT DOCUMENTS

| | | |
|---|---|---|
| EP | 0999521 A2 | 5/2000 |
| GB | 2336063 A2 | 10/1999 |

* cited by examiner

*Primary Examiner* — Sherali Ishrat
(74) *Attorney, Agent, or Firm* — Francis I. Gray; Matthew D. Rabdau; Michael A. Nelson

(57) ABSTRACT

A robust video temporal method for registration between test and reference video sequences without a priori knowledge of the respective signal parameters initially produces frame and subimage distillation measurements from the test and reference video sequences. The frame distillation measurements are linearly aligned using a local Pearson's cross-correlation coefficient (LPCCC) image to obtain a best alignment line, each pixel of which represents an LPCCC cross-correlation coefficient between frames of the test and reference video sequences. For each pixel of the best alignment line that is below a threshold, a vertical search is performed in the LPCCC image for a higher cross-correlation coefficient as the best cross-correlation coefficient to achieve temporal mapping between frames of the test and reference video sequences.

11 Claims, 3 Drawing Sheets

SYSTEMS AND METHODS FOR ROBUST VIDEO TEMPORAL REGISTRATION

CROSS-REFERENCE TO RELATED APPLICATIONS

This application claims the benefit of U.S. Provisional Application No. 60/912,167 filed on Apr. 16, 2007, entitled Systems and Methods for Robust Video Temporal Registration, which application is hereby incorporated herein by reference.

BACKGROUND OF THE INVENTION

Embodiments of the present invention relate to video test and measurement equipment, and more particularly to picture quality measurements for video.

Full reference video quality measurement and analysis performed by products, such as picture quality analyzers (PQA200, and PQA300) provided by Tektronix, Inc. of Beaverton, Oreg., use temporal registration. With temporal registration, each frame in a test video sequence is played at the same time the corresponding frame of the reference video sequence is played. With the proliferation of video formats and devices, and the associated proliferation in frame rates and temporal distortions or impairments, this prerequisite for the picture quality measurement and analysis preparation step has become more difficult to perform manually, and the automated methods of the prior art do not always work well.

In the prior art related to automatic methods for spatial distortion measurement, the methods suffer from one or more of the following shortcomings:

1) not robust over frame rate ratios other than 1.0;
2) do not give 1 to 1 of test and reference, given temporal distortions such as lost frames and frame freezes (both with an associated abrupt and locally static change in channel delay); or
3) do not work across frame resolution differences between reference and test, i.e., HD vs SD for example, and other spatial registration issues.

An example of the prior art, as given in U.S. Pat. No. 6,751,360 entitled "Fast Video Temporal Misalignment Estimation" by Jiuhuai Lu and incorporated herein by reference, does not perform well, even if the video is identical but for one being a frame repeated version of the other. Methods that use correlation of frame differences as the primary or only means of frame distillation suffer from a "chopper" effect where frame differences are 0 for repeats, but not for non-repeats, resulting in correlations corresponding to FIG. 3. In FIG. 3, the frame repeats cause zero differences every other frame, corresponding to the dark horizontal lines and weak correlation for even the best match.

It would be desirable to have an automated method to measure temporal mapping, both linear and frame by frame, along with corresponding temporal impairments, such as freeze frames and blank frames, between the test video sequence and the reference video sequence. In particular, it is desired to have one method of measurement that is robust in the presence of digital compression artifacts, random noise, quantization error and other non-linear and linear distortions and interference. It is desired for this method to be adaptive in order to work without a priori knowledge of the video content, such as the Tektronix proprietary stripe added to the video signal currently for the PQA300; aspect ratio selected; DUT pixel clock; frame rates; or other indications of the general likely video parameters, including relative spatial mapping, horizontal or vertical scaling, offset (shift) or cropping.

Finally, it is desirable that the method has both good accuracy and computational efficiency. Computational efficiency refers to a relatively low level of processing for a given accuracy.

BRIEF SUMMARY OF THE INVENTION

Accordingly, embodiments of the present invention provide systems and methods for robust video temporal registration between test and reference video signals without a priori knowledge of the respective signal parameters. The test and reference video signals are both distilled into respective frame distillation measurements and subimages. The frame distillation measurements are linearly aligned using a local Pearson's cross-correlation coefficient (LPCCC) image to obtain a best alignment line, each pixel of which represents an LPCCC cross-correlation coefficient between frames of the test and reference video signals. For each pixel of the best alignment line that is below a threshold, a vertical search is performed in the LPCCC image for a higher cross-correlation coefficient as the best cross-correlation coefficient to achieve temporal mapping of the frames of the test video signal to frames of the reference video signal. If the best cross-correlation coefficient for any frame pair is less than the threshold, then a further search is done by spatially aligning the subimages to obtain a new best cross-correlation coefficient. Finally, if further searching is desired because the new best cross-correlation coefficient is less than the threshold, then summary line and column one dimensional images from the LPCCC image are spatially aligned to find a highest correlation coefficient. The highest correlation coefficient is then used to temporally map the test and reference video signal to produce an array of test and reference video frame pairs.

The objects, advantages and other novel features of the present invention are apparent from the following detailed description when read in conjunction with the appended claims and attached drawing.

DETAILED DESCRIPTION OF THE INVENTION

Embodiments of the present invention build on recent improvements in video test developed by Kevin Ferguson, the present inventor, which is described in U.S. patent application Ser. No. 11/944,050 (the '050 application) entitled "Measurement Apparatus and Method of Measurement of Video Spatial Scale, Offset and Cropping" and filed on Nov. 21, 2007, and which is hereby herein incorporated by reference. The '050 application claims the benefit of U.S. Provisional Patent Application Ser. No. 60/867,087 (the '087 application), filed on Nov. 22, 2006, which is also hereby herein incorporated by reference.

Figure 1:
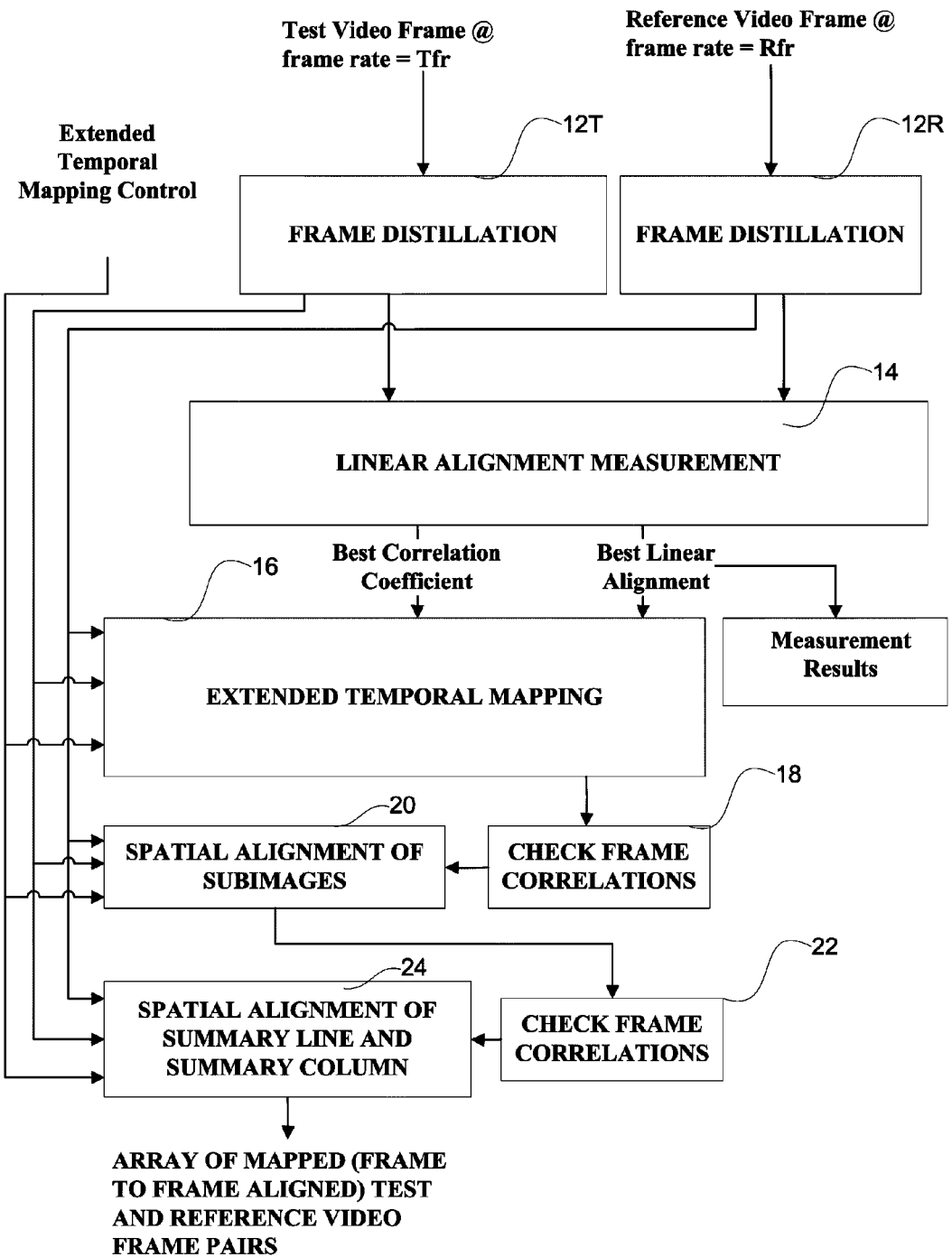
FIG. 1 is a flow chart view of a method for robust video temporal registration according to the present invention.

Referring now to FIG. 1, an input signal is processed using the following steps: frame distillation 12T, 12R, linear alignment 14, and extended temporal mapping 16. Additional steps include checking frame correlations (18) from the extended temporal mapping 16 to gate the spatial alignment of subimages (20). Further steps include checking frame correlations (22) from the spatial alignment of subimages 20 to gate spatial alignment of summary line and summary column (24).

Step 1: Frame Distillation

Each frame of both test and reference video is distilled into frame distillation measurements as follows:

A) subimages and frame summaries of mean, standard deviation and RMS frame differences; and B) as per '050 application, summary line and summary column.

The mean, standard deviation and RMS frame difference subimages are each generated by dividing each frame into image blocks and calculating the corresponding measurement (mean, standard deviation and RMS frame difference) per image block. These block measurements each represent a pixel within a "frame measurement distillation image" per frame. For example, the RMS frame difference distillation image is calculated per frame image block as:

Block RMS frame difference [nth frame]=root(mean ((framePixel[$x$, $y$, nth frame]−framePixel[$x$, $y$,($n$−1)th frame])^2))

The frame summary measurements are the same measurements made over the entire frame instead of over just a block subimage.

Step 2: Linear Alignment Measurement

In some embodiments, a linear alignment measurement according to the method described in the '050 application is performed. This operation may be performed, for example, if overall correlation coefficient is too low for each preceding measurement—successive Linear Alignment Measurement via Maximum Hough Transform of the Local Pearson's Cross-Correlation Coefficient (LPCCC) Image according to the method described in the '050 application.

First, the mean frame summary array pair is used as the two (1 high×frame count wide) image inputs, one image for the entire test video sequence and the other image for the entire reference video sequence, input to the method given in the '050 application.

If the mean of the resulting LPCCC values along a chosen brightest line is less than a given threshold according to CxyWorthUsing=0.8$F$*crossCorThreshold(croppedRefDiffLineParams width)

where crossCorThreshold(resolution)=squareRoot(240.0/(240.0+resolution))

then the next distillation frame summary array/image pair, the RMS frame difference distillation images (again, one for the entire test sequence and one for the entire reference sequence), are used as input to the alignment measurement method provided in the '050 application. Again the mean along the LPCCC max line is calculated and checked against the CxyWorthUsing threshold. If below the threshold, the next distillation image pair is used—the standard deviation frame summary distillation. If none of these is above the threshold, a user controlled choice may be made—for speed use the measurement with the highest coefficient or for accuracy proceed to the next step. For even more accuracy, instead of best linear fit, extended temporal mapping may be performed in the next step.

Figure 2:
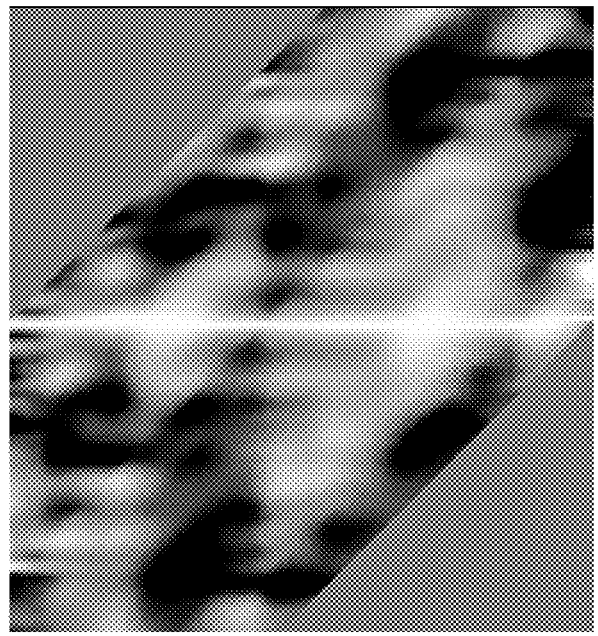
FIG. 2 is a pictorial view of a local Pearson's cross-correlation coefficient (LPCCC) image of test and reference mean frame summary distillations.
Figure 3:
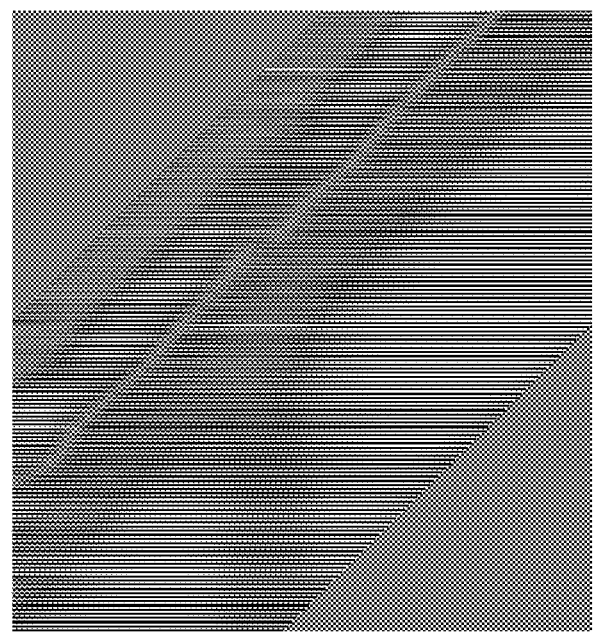
FIG. 3. Is a pictorial view of an LPCCC image of test and reference RMS frame difference summary distillations.
Figure 4:
FIG. 4 is a pictorial view of an LPCCC image of test and reference frame standard deviation summary distillations.
Figure 5:
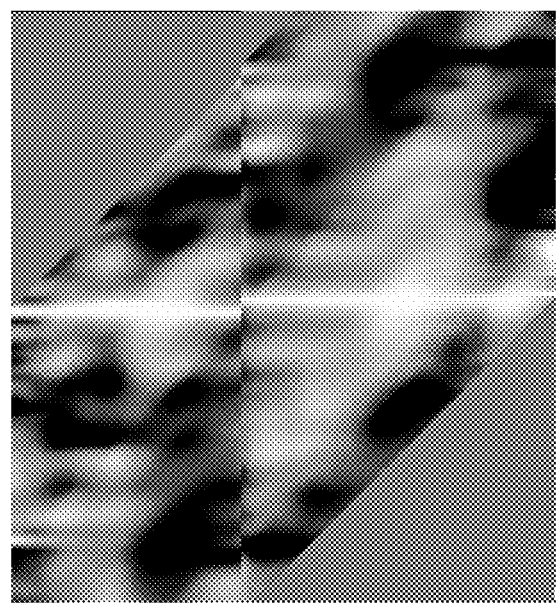
FIG. 5 is a pictorial view of an LPCCC image of test and reference mean frame summary distillations of the sequences shown in FIG. 2.

Examples of the LPCCC image of the three frame summary distillations are given in FIGS. 2 through 4 for a CIF 60 frames per second (using frame repeats) vs SD 30 frames per second (standard definition) versions of the same video. The lack of robustness of prior art using frame differences is shown by comparing these three Figs. Also, note the bright line of FIG. 2. This is the line corresponding to the best linear match between video sequences using the method described in the '050 application. Steps 3, 4 and 5 re-use this information.

In FIG. 3 displaying the correlation coefficient between test frame offset vertically vs reference frame number horizontally ideally has a well defined bright line corresponding to the best linear mapping between video sequences, as in FIG. 2. However, in FIG. 3 the frame repeats cause zero differences every other frame, corresponding to the dark horizontal lines, and weak correlation for even the best match, such as a not so bright, brightest line.

Step 3: Extended Temporal Mapping

As shown, for each horizontal position of the LPCCC, when the pixel value (which is the Pearson's cross-correlation coefficient) on the best linear alignment line (brightest line) is below the threshold, a search is performed vertically for a higher correlation coefficient corresponding to a better local match of frames. This vertical search is constrained to look forward only in the cases where monotonicity in frame count may be assumed (a common constraint).

Step 4: Check Frame Correlations to Gate Spatial Alignment of Subimages

When further searching is allowed based upon accuracy, speed control, or a combination of both:

for each frame match search of step 3, when the best cross-correlation coefficient of the previous steps for a given frame is below the threshold, the distillation images are spatially aligned and the corresponding highest correlation coefficient is used per frame; or the distillation images are spatially aligned using the method described in the '050 application.

Step 5: Check Frame Correlations to Gate Spatial Alignment of Summary Line and Summary Column When further searching is allowed based upon accuracy, speed control, or a combination of both:

for each frame match search of step 4, when the best cross-correlation coefficient of all the previous steps for a given frame is below the threshold, the summary line and summary column one dimensional images are spatially aligned and the mapping corresponding to the highest correlation coefficient is used per frame; or the summary line and summary column one dimensional images are spatially aligned using the method described in the '050 application. What is determined is the highest correlation coefficient, taken as the square root of the sum of squares of the summary line result and the summary column result.

In addition to solving problems associate with the prior art methods, the above-described process may also provide the ability to flexibly control the speed and accuracy to a desired level, while providing a figure of merit, such as a correlation coefficient, at each successive stage in the process.

Thus the present invention provides a robust video temporal registration without a priori knowledge of test and reference video sequences by distilling the sequences into frame distillation measurements that are linearly aligned using an LPCCC image to obtain a best alignment line, then temporally mapping each frame represented by the pixels of the best alignment line by searching vertically in the LPCCC image for a best correlation coefficient.

What is claimed is:

1. A method of aligning frames between test and reference video sequences comprising the steps of:
   distilling each frame of the test and reference video sequences into frame distillation measurements;
   from the frame distillation measurements performing a linear alignment measurement using a linear Hough transform of a local Pearson's cross-correlation coefficient (LPCCC) image for spatial alignment of the frames between the test and reference video sequences to find a best fit line through the LPCCC image; and
   for each pixel of the LPCCC image along the best fit line searching vertically for a higher correlation coefficient when the pixel has a value less than a threshold to find a better frame match for temporal alignment of the frames between the test and reference video sequences.

2. The method as recited in claim 1 wherein the frame distillation measurements comprise summaries of mean, standard deviation and RMS differences between corresponding frames of the test and reference video sequences.

3. The method as recited in claim 1 wherein the frame distillation measurements comprise summaries of mean, standard deviation and RMS differences between subimages for each pair of corresponding frames between the test and reference video sequences.

4. The method as recited in claim 1 where the frame distillation measurements comprise summary line and summary column one dimensional images of the LPCCC image.

5. The method as recited in claim 2 wherein the performing step comprises the steps of:
   determining a best line fit mean value from the frame summary mean differences using a mean frame summary array pair as two one-by-framecount wide image inputs for the test and reference video sequences; and
   comparing the best line fit mean value with the threshold.

6. The method as recited in claim 5 wherein the performing step further comprises the steps of:
   if the best line fit means value is less than the threshold, determining a best line fit RMS value from the frame summary RMS differences using an RMS frame summary array pair as two one-by-framecount wide image inputs for the test and reference video sequences; and
   comparing the best line fit RMS value with the threshold.

7. The method as recited in claim 6 wherein the performing step further comprises the steps of:
   if the best line fit RMS value is less than the threshold, determining a best line fit standard deviation value from the frame summary standard deviation differences using a standard deviation summary array pair as two one-by-framecount wide image inputs for the test and reference video sequences; and
   comparing the best line fit standard deviation value with the threshold.

8. The method as recited in claim 7 wherein the performing step further comprises the step of user selecting, if the best line fit standard deviation value is less than the threshold, the best line fit measurement from among the best line fit mean, RMS and standard deviation values having the highest correlation coefficient.

9. The method as recited in claim 3 wherein the distilling step comprises the steps of:
   dividing each frame into image blocks; and
   calculating corresponding mean, standard deviation and RMS differences per image block to provide the subimage summaries.

10. The method as recited in claim 9 further comprising the step of spatially aligning the subimages as in the performing step if the best correlation coefficient is less than the threshold to find a highest correlation coefficient per frame as a new frame match.

11. The method as recited in claim 4 further comprising the step of spatially aligning the summary line and summary column one dimensional images if the best correlation coefficient is less than the threshold to find a highest correlation coefficient per frame as a new frame match.

* * * * *